United States Patent
Roos et al.

(10) Patent No.: US 7,882,998 B2
(45) Date of Patent: Feb. 8, 2011

(54) METHOD AND APPARATUS OF PRODUCING A WELDED CONNECTION BETWEEN THE SURFACES OF TWO PLANAR WORKPIECES

(75) Inventors: Arne Roos, Juliusburg (DE); Jorge F. Dos Santos, Avendorf (DE)

(73) Assignee: Helmholtz-Zentrum Geesthacht Zentrum für Material-und Küstenforschung GmbH, Geesthacht (DE)

( * ) Notice: Subject to any disclaimer, the term of this patent is extended or adjusted under 35 U.S.C. 154(b) by 649 days.

(21) Appl. No.: 11/527,030

(22) Filed: Sep. 26, 2006

(65) Prior Publication Data
US 2007/0080191 A1    Apr. 12, 2007

(30) Foreign Application Priority Data
Sep. 26, 2005    (DE) .................. 10 2005 045 954

(51) Int. Cl.
*B23K 20/12* (2006.01)
(52) U.S. Cl. ..................................... 228/112.1; 228/2.1
(58) Field of Classification Search .................. 228/2.1, 228/112.1, 212; 427/11; 156/73.5
See application file for complete search history.

(56) References Cited

U.S. PATENT DOCUMENTS

| | | | |
|---|---|---|---|
| 3,831,262 A | | 8/1974 | Luc et al. |
| 4,245,769 A | * | 1/1981 | Meginnis ................. 228/173.3 |
| 5,551,623 A | | 9/1996 | Collot et al. |
| 6,703,254 B2 | * | 3/2004 | Saitoh et al. .................. 438/29 |
| 6,769,595 B2 | * | 8/2004 | Stol et al. ................ 228/112.1 |
| 6,793,118 B2 | | 9/2004 | Palm et al. |
| 6,915,939 B2 | * | 7/2005 | Hashimoto et al. ............ 228/2.1 |
| 7,150,389 B1 | * | 12/2006 | Knipstrom et al. ....... 228/112.1 |
| 2002/0125297 A1 | | 9/2002 | Stol et al. |
| 2002/0158109 A1 | | 10/2002 | Gendoh et al. |

(Continued)

FOREIGN PATENT DOCUMENTS

DE    2152630    4/1972

(Continued)

OTHER PUBLICATIONS

JPO machine translation of JP2005-034863, published Feb. 10, 2005.*

(Continued)

*Primary Examiner*—Jessica L Ward
*Assistant Examiner*—Kevin E Yoon
(74) *Attorney, Agent, or Firm*—Marshall, Gerstein & Borun LLP

(57) ABSTRACT

The present invention relates to a method for producing a welded connection between a first workpiece and a second workpiece comprising the following steps: providing a first workpiece and a second workpiece, arranging the second workpiece on a surface of the first workpiece, placing a friction tool by the friction area thereof onto that surface of the second workpiece which is remote from the first workpiece, and rotating the friction tool, with the result that a welded connection is formed between the first workpiece and the second workpiece, the friction area rubbing on that surface of the second workpiece which is remote from the first workpiece, and the contact region between the friction area and the second workpiece running completely in that surface of the second workpiece which is remote from the first workpiece.

17 Claims, 7 Drawing Sheets

U.S. PATENT DOCUMENTS

Figure 1:
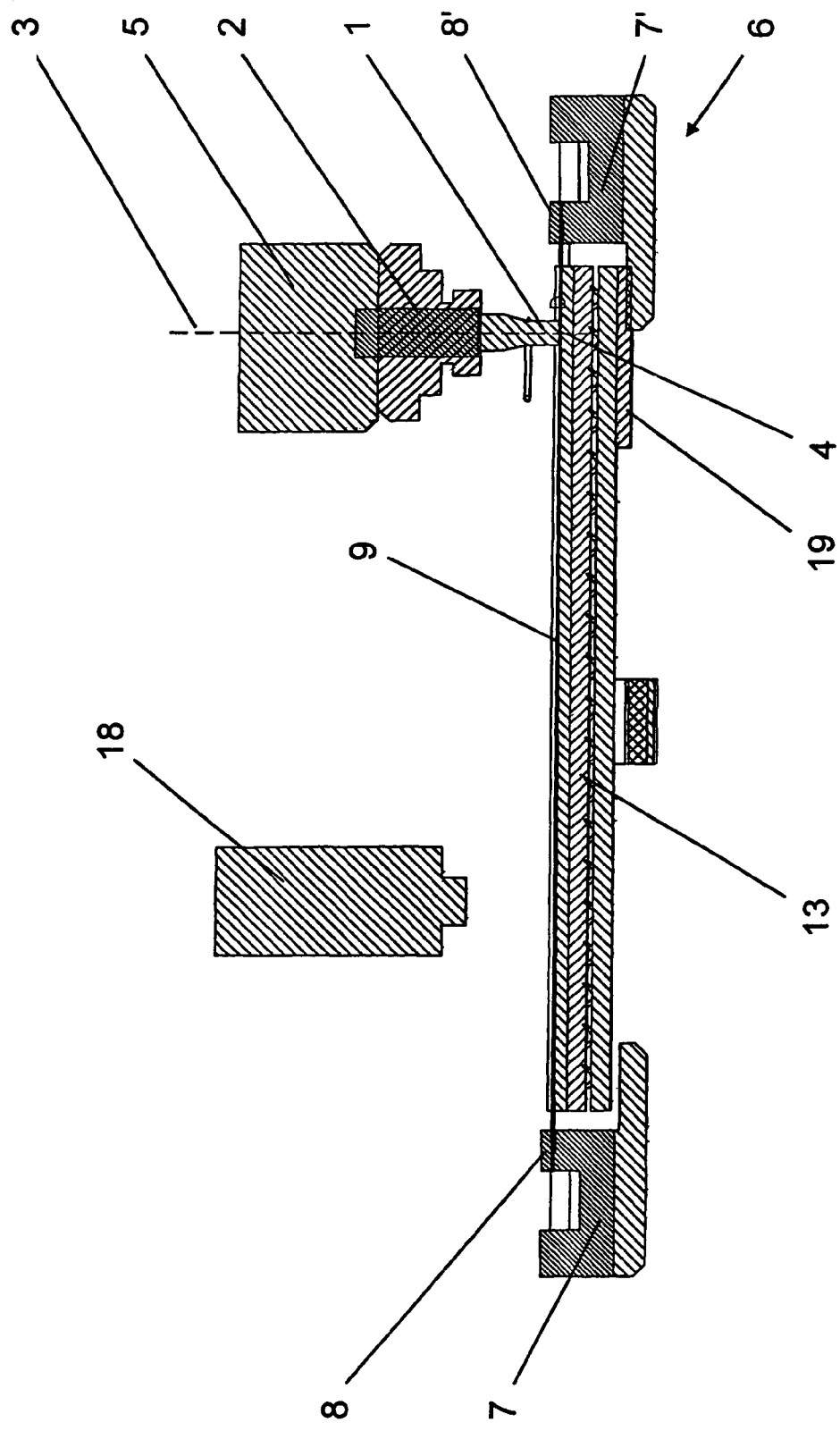

| | | |
|---|---|---|
| 2004/0134971 A1* | 7/2004 | Narita et al. .............. 228/112.1 |
| 2004/0155092 A1* | 8/2004 | Onuma et al. ............ 228/112.1 |
| 2005/0072832 A1* | 4/2005 | Han et al. ................ 228/112.1 |
| 2006/0124701 A1* | 6/2006 | Chen et al. ............... 228/112.1 |
| 2006/0138197 A1 | 6/2006 | Aota et al. |

FOREIGN PATENT DOCUMENTS

| | | |
|---|---|---|
| DE | 2210855 | 9/1972 |
| DE | 19731638 | 1/1999 |
| DE | 19746812 | 4/1999 |
| EP | 0445035 | 9/1991 |
| JP | 10225781 | 8/1998 |
| JP | 2003326371 | 11/2003 |
| JP | 2005034863 | 2/2005 |
| WO | WO 9310935 | 6/1993 |
| WO | WO 9845080 | 10/1998 |
| WO | WO 9912694 | 3/1999 |
| WO | WO 9939861 | 8/1999 |
| WO | WO 0136144 | 5/2001 |
| WO | WO 2004110692 | 12/2004 |

OTHER PUBLICATIONS

European Search Report for EP 06 02 0028.

* cited by examiner

METHOD AND APPARATUS OF PRODUCING A WELDED CONNECTION BETWEEN THE SURFACES OF TWO PLANAR WORKPIECES

CROSS-REFERENCE TO RELATED APPLICATION

The present application claims the benefit of priority of German Patent Application No. 10 2005 045 954.4 filed Sep. 26, 2005. The entire text of the priority application is incorporated herein by reference in its entirety.

The welding of planar workpieces whose surfaces bear against one another, so that a so-called parallel joint is formed between the workpieces to be welded, that is to say that the workpieces at least partly overlap, has proved to be problematic in many cases. Due to the comparatively high energy input that occurs in conventional welding methods, microstructure alterations may occur in the planar workpieces, particularly in the region of the weld seam, said microstructure alterations adversely influencing the material properties. Furthermore, there is the risk of non-uniform, thermally governed expansion of the workpieces occurring, with the result that the latter no longer bear against one another in a planar manner in the regions outside the weld seam. These two problems are of importance particularly when two planar workpieces are not just intended to be connected to one another at individual sections, rather linear weld seams extending along the surfaces bearing against one another are required.

So-called diffusion welding has been developed in order to avoid the problem of the high punctiform energy inputs into the planar workpieces. In the diffusion welding process, two workpieces are connected to one another by heating the workpieces at least in the region in which a connection is to be formed, and simultaneously exerting a pressure on the workpieces perpendicular to the connection area. On account of the pressure and the elevated temperature, diffusion processes commence on account of which the workpieces bearing against one another form a fixed connection.

WO 99/12694 has already disclosed a method and an apparatus for diffusion welding in which the workpieces to be welded are pressed against one another and the region of the weld seam is heated inductively or by some other heat source in order to induce the diffusion between the workpieces. While the workpieces are pressed against one another, they can also be moved relative to one another along the connection plane, so that friction occurs between the workpieces. In this case, oxides that have formed on the connection areas are removed by the friction. A substantial thermal energy input is not effected as a result of the relative movement.

What is disadvantageous about diffusion welding, however, is that in this case, too, it is necessary for the workpieces that are to be welded to be heated, albeit to a lesser extent, which, in the case of alloys having low conversion temperatures, may still have the effect that microstructure alterations occur in the entire workpieces, and associated with said alterations an alteration of the workpiece properties.

In contrast to diffusion welding, friction stir welding has proved to be a method in which the thermal energy introduced over the entire volume of the workpieces is comparatively low. Thus, it is known from WO 93/10935, for example, to connect two workpieces along a butt joint by moving a rotating pin along the connection area between the workpieces, a plasticization of the material of the workpieces occurring in the region near the connection area. After the subsequent solidification of the plasticized region, a cohesive connection has formed.

WO 01/36144 additionally discloses, for connecting two planar workpieces which bear against one another along their surfaces, lowering a rotating pin firstly into the first, upper workpiece and subsequently into the second, underlying workpiece, the material that is plasticized in the process being caught and later being pressed into the remaining hole after the pin has been withdrawn. In this way, a parallel joint connection between two planar workpieces can also be produced by means of friction stir welding. What is disadvantageous about this method, however, is that only punctiform connections can be produced and it is additionally necessary for the pin to penetrate into both workpieces, so that an intermixing of the materials of the workpieces occurs in the region of the connection. This is undesirable particularly when workpieces made of different materials are intended to be connected to one another, where the separation of the materials is intended essentially to be maintained.

The problem of a lowest possible heat input in conjunction with a cleanest possible separation of different materials occurs particularly in the production of so-called Al—U/Mo—Al sandwich nuclear fuel elements. These reactor fuel elements, provided for use in nuclear reactors, comprise two aluminium top plates between which a uranium-molybdenum plate is situated.

In order, on the one hand, to ensure that the fissionable uranium material is securely confined and, on the other hand, there are no gas inclusions in the fuel element which may expand upon heating, it is necessary to connect the individual plates to one another. In order to reliably eliminate the problem of gas inclusions, it is necessary, in particular, to provide not just punctiform connections but connections running linearly in meandering fashion over the area of the fuel elements. In order that, furthermore, the energy distribution of the neutrons emerging from the fuel element is unambiguously defined, intermixing of the Al of the top plates with the U—Mo should not occur.

It has been found with regard to U—Mo that microstructure alterations occur in this material even at low temperatures, and they have the effect that the material is unsuitable for further use as a reactor fuel element. This has the effect that the energy introduced into the workpieces during the production of the connection must be kept as low as possible.

The present invention is thus based on the object of providing a method and an apparatus for producing a welded connection between two workpieces along a parallel joint in which thermal energy input into the workpieces is kept low and an intermixing of the materials of the workpieces is avoided.

This object is achieved by means of a method comprising the following steps of:
  providing a first workpiece and a second workpiece,
  arranging the second workpiece on a surface of the first workpiece,
  placing a friction tool by the friction area thereof onto that surface of the second workpiece which is remote from the first workpiece, and
  rotating the friction tool, with the result that a welded connection is formed between the first workpiece and the second workpiece, the friction area rubbing on that surface of the second workpiece which is remote from the first workpiece, and the contact region between the friction area and the second workpiece running completely in that surface of the second workpiece which is remote from the first workpiece.

According to the invention, the contact region between the friction area and the second workpiece runs completely in that surface of the second workpiece which is remote from the first workpiece. A friction contact between the second workpiece, on the one hand, and the friction tool, on the other hand, thus occurs only in that surface of the second workpiece which is remote from the first workpiece. Consequently, the friction tool does not penetrate into the volume of the second workpiece, with the result that in particular structural alterations of the second workpiece and also of the first workpiece are avoided. All that may happen is that the second workpiece is compressed on account of the pressure exerted by the friction tool.

The heat input into the workpieces is effected only through that surface of the second workpiece which is remote from the first workpiece, the material of the second workpiece beneath the friction tool being plasticized. In this case, the rotational speed of the workpiece is chosen in such a way that the energy input into the second workpiece is sufficient to form a welded connection between the first, lower workpiece and the second, upper workpiece.

Besides the property that the friction tool does not penetrate into the material of the workpieces to be connected, an additional result is that the thermal energy input also remains restricted locally on the region in the vicinity of the friction tool. Large-area heating of the workpieces is not effected. Finally, the materials of the two workpieces to be connected are not intermixed either, rather the interfaces remain essentially unaffected.

What is thus achieved by means of the method according to the invention is that during the formation of the welded connection, particularly in the first, lower workpiece, no or only very slight alterations of the microstructure of the material occur, the slight alterations then being restricted to the region of the weld seam.

Moreover, the method according to the invention makes it possible to provide workpieces with a coating, for example for increasing the surface hardness or for protection against corrosion. For this purpose, the material of the coating is applied to the first workpiece to be coated in the form of a thin film as second workpiece in the sense of the method. The film and the workpiece may subsequently be connected to one another by means of the method according to the invention.

In order to be able to influence the extent of the region of the second workpiece which is plasticized during the rotation of the friction tool, it is preferred if a predetermined pressure is exerted on the surface of the second workpiece during the rotation of the friction tool.

If a linear welded connection is intended to be produced between the workpieces, in one preferred embodiment of the method the friction tool is moved during the rotation thereof along the surface of the second workpiece. In order in this case to prevent the friction tool from penetrating into the surface of the second workpiece, it is furthermore preferred for the second workpiece to be pressed onto the first workpiece before the friction tool in the direction of movement. This prevents a bulging of the second workpiece, which may occur in particular as a result of the local temperature alteration on account of the local heating.

In a further preferred embodiment of the method according to the invention, the first workpiece, remote from the friction tool, is additionally heated, thereby reducing the energy which has to be introduced by friction into the second workpiece in order to produce a welded connection. In this case, the first workpiece may be heated by means of a heating element on which said workpiece bears. In another preferred embodiment, the thermal energy may also be introduced inductively into the first workpiece. Furthermore, it is preferred if the thermal energy is introduced in a region beneath the friction tool, so that the source for the thermal energy and the location of the energy input by means of friction lie opposite one another. In this case, that region of the workpieces which is influenced by the production of the connection remains restricted to the connection region.

However, the level of the energy input into the workpieces on account of heating is at any rate far below the threshold at which microstructure alterations occur in the workpieces.

In a further preferred embodiment of the method according to the invention, a third planar workpiece is provided, and the first and second workpieces are arranged above it. This is followed by the placing and rotating of the friction tool on that surface of the second workpiece which is remote from the first workpiece. In this way, it is possible to produce a welded connection between the individual elements of a sandwich component, in particular of a reactor fuel element, with the advantages already mentioned.

Moreover, it is preferred if the workpieces are held along their outer edges and a first tensile stress running parallel to the plane of that surface of the second workpiece which bears against the friction tool is exerted on the workpieces. Moreover, in a further preferred embodiment, a second tensile stress is exerted on the workpieces, said second tensile stress likewise running parallel to the plane of the surface bearing against the friction tool and having at least one component running perpendicular to the first tensile stress. In this way, the workpieces are prestressed and bulges do not occur in the workpieces during the formation of the connection.

In a first alternative, the friction tool may be rotated about an axis running perpendicular to that surface of the second workpiece which is remote from the first workpiece, which enables a comparatively large contact region. In this case, it is particularly preferred if means which effect a material transport from the outer edge of the friction area towards the axis of rotation are provided on a friction area formed in circular fashion. This prevents material plasticized by the friction contact from being removed from the contact region.

On the other hand, it is also possible for the friction tool to be rotated about an axis running with an inclination with respect to the perpendicular to the surface of the second workpiece. In particular, the axis of rotation may then run parallel to the surface of the second workpiece, in which case the extent of the contact region is minimized to a line.

Furthermore, it is preferred if that surface of the first workpiece which faces the second workpiece is at least partly irradiated before the second workpiece is arranged on the first workpiece. In this case, laser irradiation or electron irradiation is appropriate. Both are associated with the advantage that oxides that have formed on the surface of the first workpiece are removed, with the result that the workpieces can form a connection more easily in this region. This is because oxide layers can act as a diffusion barrier and thus render the formation of a cohesive connection more difficult. Moreover, electron irradiation, in particular, serves for producing microholes on the joining area of the first workpiece, which leads to a mechanical "interlocking" of the workpieces and thus to a stabler connection.

Moreover, it is preferred if the region between the workpieces is evacuated by means of a vacuum pump, for example, with the result that the workpieces bear closely against one another and gas inclusions cannot occur between the workpieces.

Moreover, the above object is achieved by means of an apparatus comprising a friction tool with a friction area, which friction tool can be driven in rotary fashion about an axis of rotation, comprising a support device for fixing at least two workpieces bearing at least partly one on another in a workpiece plane, the surface of one of the workpieces facing the friction tool in the fixed state, the friction area being able to be placed onto that surface of one of the workpieces which faces the friction tool, and the friction area being configured in such a way that during the rotation of the friction area on that surface of one of the workpieces which faces the friction tool, the contact region between the friction area and the workpiece runs completely in the surface facing the friction tool.

The friction area is formed in such a way that the contact region between the friction area and the second workpiece runs completely in that surface of the second workpiece which is remote from the first workpiece, so that the friction area may, for example, be formed in planar fashion. A friction contact between the second workpiece, on the one hand, and the friction tool, on the other hand, thus occurs only in that surface of the second workpiece which is remote from the first workpiece and the friction tool does not penetrate into the volume of the second workpiece, with the result that in particular structural alterations of the second workpiece and also of the first workpiece are avoided.

With regard to the advantages associated with the apparatus according to the invention, reference may be made to the explanations concerning the method according to the invention. In particular, by means of the apparatus according to the invention, the thermal energy input into the workpieces is reduced and an intermixing of the materials of the individual workpieces does not occur.

In order to effectively prevent a removal of plasticized material in the plane of a circular friction area formed on a cylindrical friction tool, the axis of rotation of which runs perpendicular to the supporting area, in one preferred embodiment of the apparatus, the friction area is provided with grooves which proceed from the outer edge region of the friction area and run with an inclination with respect to the tangent of the circumference of the friction area towards the centre. The grooves are furthermore preferably curved towards the centre of the friction area. In this case, the grooves function as channels in which plasticized material is conveyed towards the centre of the friction area.

In an alternative embodiment of the apparatus according to the invention, the friction area has a spherical form, with the result that the friction tool can also be placed onto curved workpiece surfaces. This is advantageous particularly when the apparatus according to the invention is intended to be used for coating workpieces, the coating firstly being applied in the form of a thin film. In particular an application in the case of sockets of ball-and-socket joints is conceivable here.

In a further alternative embodiment, the friction tool is formed as a cylinder, the circumferential area of the cylinder forming the friction area. In this case, the contact region between friction area and surface of the workpiece is restricted to a contact line, with the result that the energy input into the second workpiece is effected by friction in a smallest possible region.

In order to ensure in this case, too, that no material is removed from the contact region, the circumferential area is furthermore preferably provided with a first and a second helical circumferential groove, the first circumferential groove running from the first end of the cylinder towards the centre and the second circumferential groove running from the second end towards the centre, and the circumferential grooves running towards the centre of the cylinder with mutually opposite pitch.

It is furthermore preferred if the apparatus has an electrical resistance heating element, which can be regulated in a simple manner, for introducing thermal energy into the first workpiece. As an alternative to the resistance heating element, an induction coil may also be provided, by means of which metallic workpieces can be heated contactlessly.

In a first alternative, a supporting area is provided beneath the support device, and the entire supporting area is provided with heating elements, so that the entire first workpiece is heated and stresses do not occur within the first workpiece on account of temperature differences. In a second alternative, the heating element is arranged such that it is moveable relative to the supporting area, so that the heating element can be moved parallel to the friction tool in order to minimize that region of the workpieces which is heated.

Figure 2:
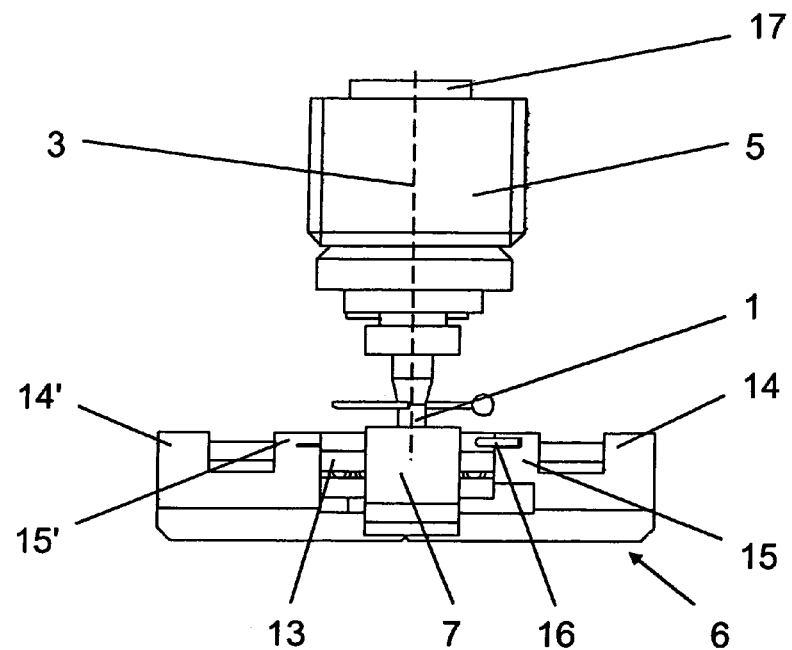
Figure 3:
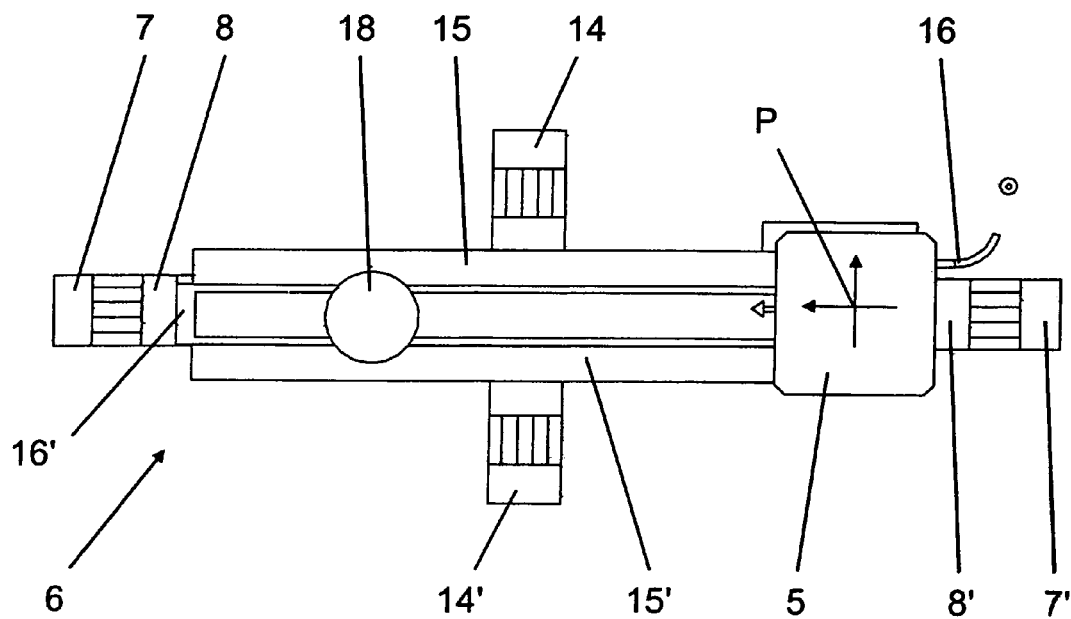
Figure 4:
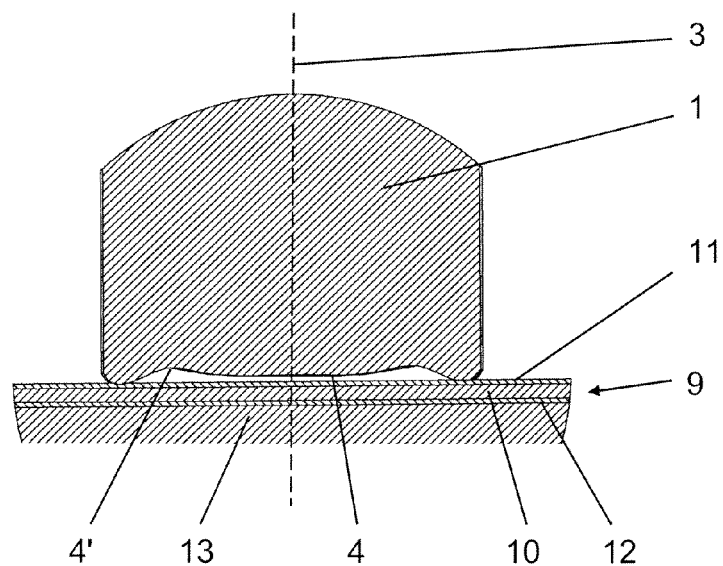
Figure 5:
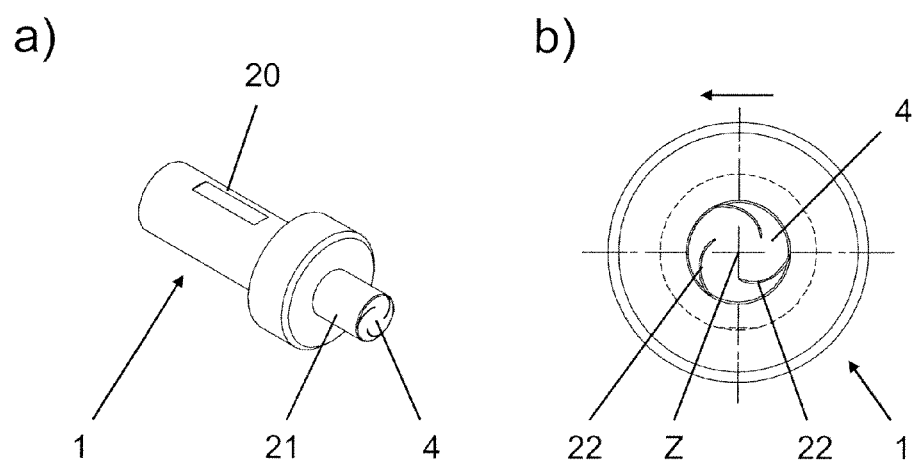
Figure 6:
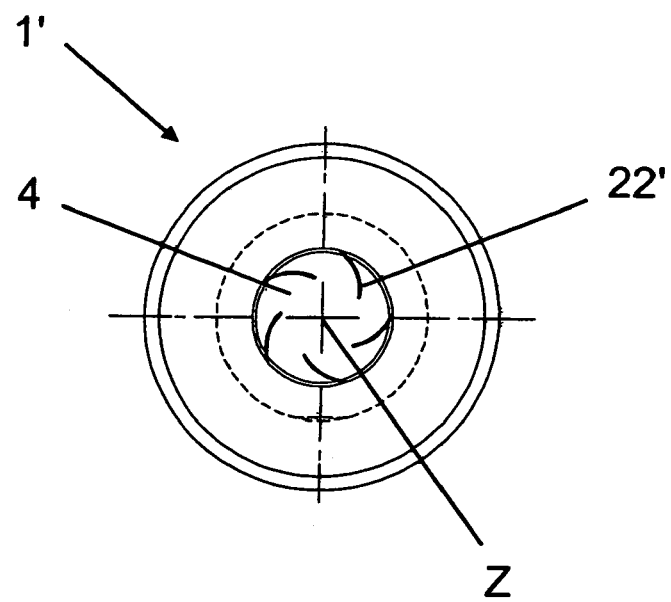
Figure 7:
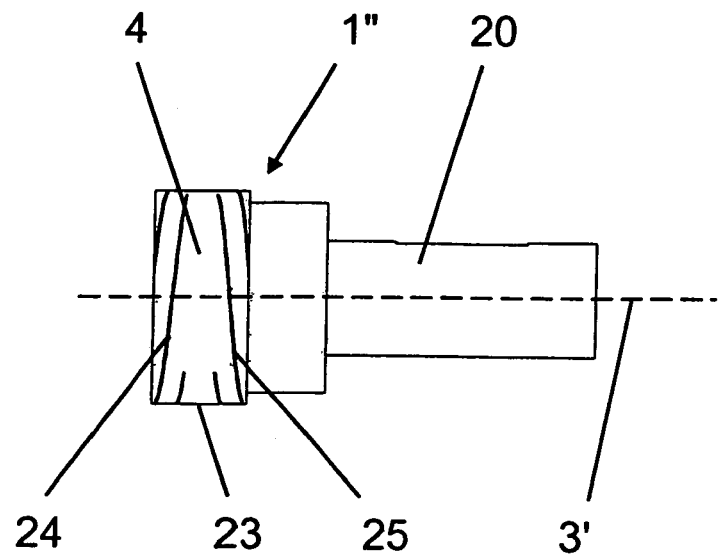
Figure 8:
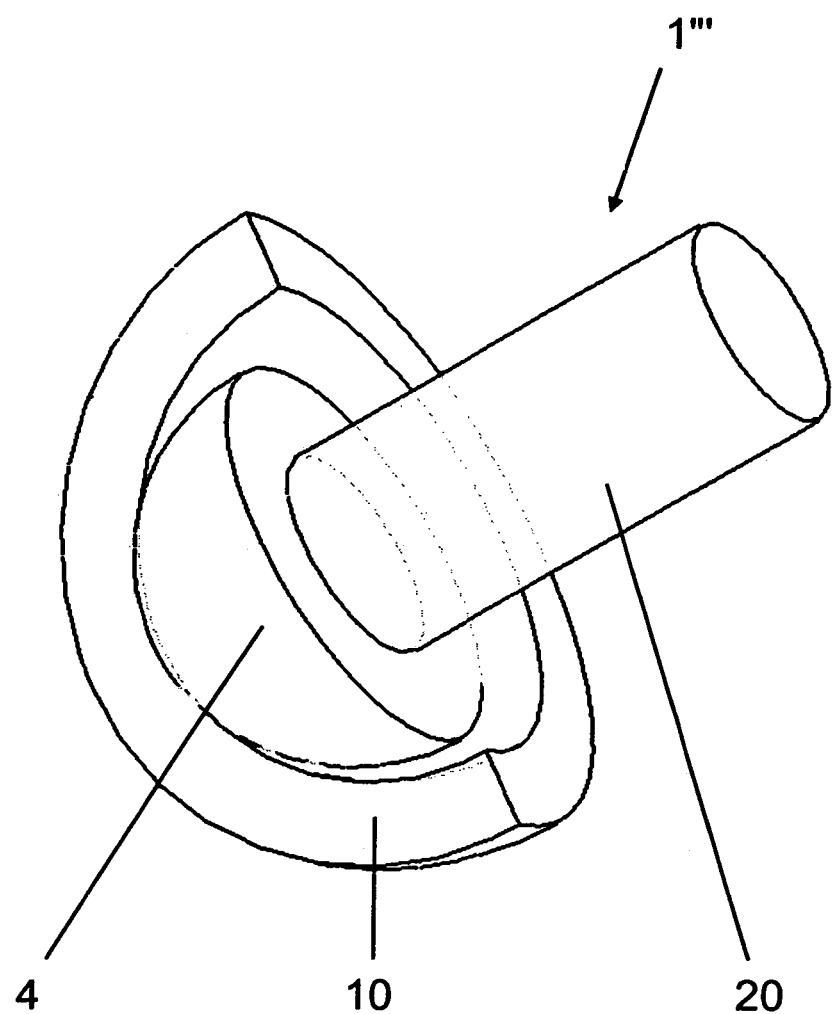
Figure 9:
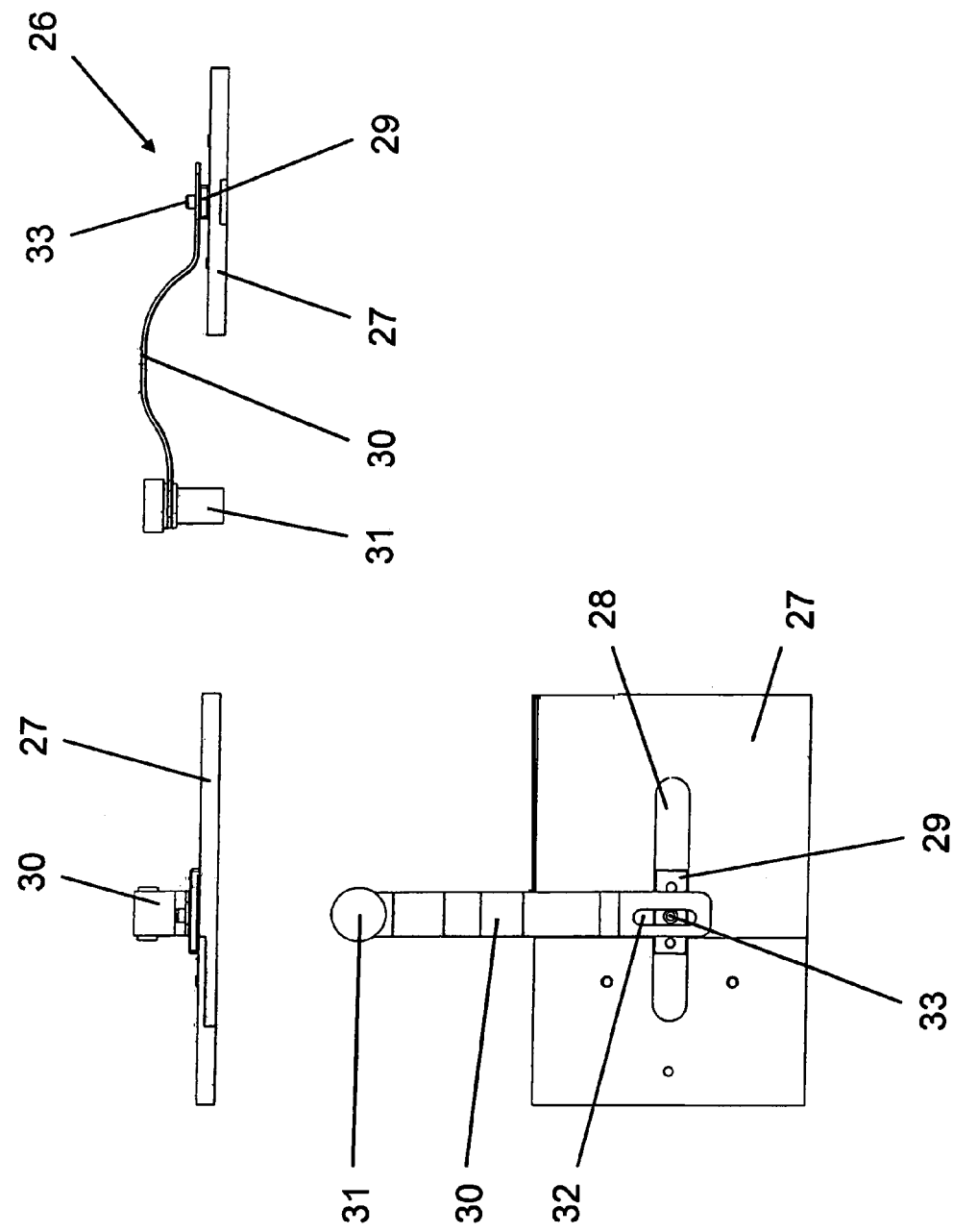
Figure 10:
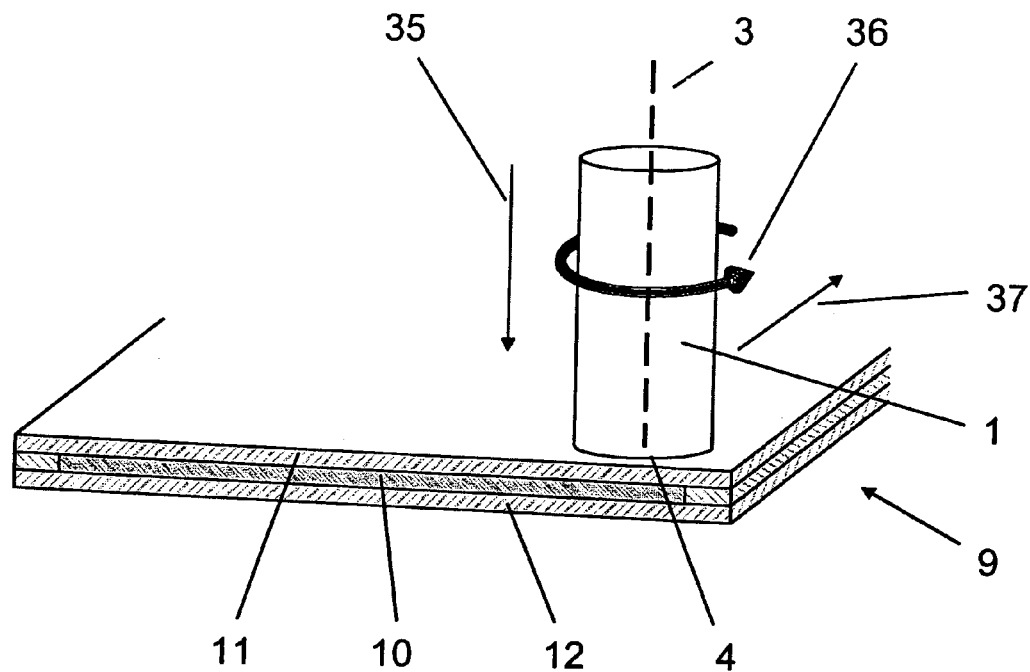
Figure 11:
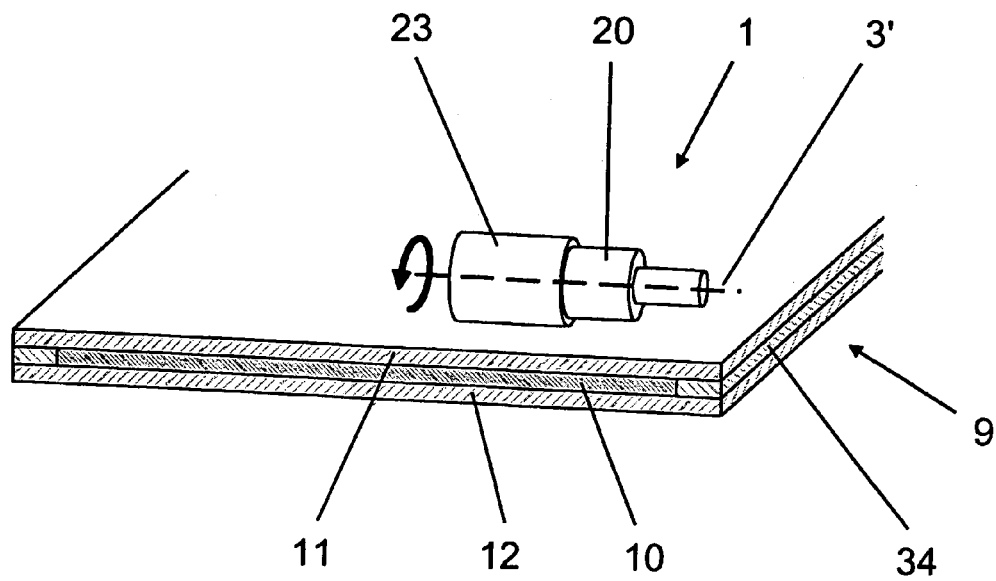

The present invention is explained below with reference to a drawing showing only preferred exemplary embodiments. In the drawing:

FIG. 1 shows an exemplary embodiment of an apparatus according to the invention in longitudinal section, FIG. 2 shows the apparatus from FIG. 1 in side view, FIG. 3 shows the apparatus from FIG. 1 in plan view, FIG. 4 shows the friction tool of the apparatus from FIG. 1 placed onto the surface of a workpiece stack, FIG. 5 shows a first exemplary embodiment of a friction tool in perspective illustration (a) and in plan view (b), FIG. 6 shows a second exemplary embodiment of a friction tool in plan view, FIG. 7 shows a third exemplary embodiment of a friction tool in side view, FIG. 8 shows a fourth exemplary embodiment of a friction tool in perspective illustration, FIG. 9 shows a holding-down device for an apparatus in accordance with FIG. 1 in a view from the rear, in side view and in a view from above, FIG. 10 shows a first schematic illustration with respect to a first exemplary embodiment of the method according to the invention, and FIG. 11 shows a schematic illustration with respect to a second exemplary embodiment of the method according to the invention.

The exemplary embodiment of an apparatus according to the invention for producing a welded connection between planar workpieces as illustrated in FIGS. 1 to 4 has a friction tool 1 connected to a drive 2. The drive 2 drives the friction tool 1 in rotary fashion about an axis 3 of rotation, the friction tool 1, which is formed cylindrically in the lower section, having a circular friction area 4 arranged perpendicular to the axis 3 of rotation (also see FIG. 4). The friction tool 1 is fitted together with the drive 2 on a holder 5.

A support device 6 is provided beneath the holder 5 with the friction tool 1, said support device having first clamping elements 7, 7', which are in turn provided with first clamping jaws 8, 8'. A workpiece stack 9 can be clamped into the first clamping jaws 8, 8', the workpiece stack 9 comprising a first central workpiece 10, a second workpiece 11 arranged above the latter, and a third workpiece 12 arranged below the first workpiece 10. In this case, the workpieces 10, 11 and 12 are formed in planiform fashion, that is to say that their dimensions in terms of length and width far exceed the thickness of the workpieces 10, 11 and 12. In particular, the first workpiece 10 may have a thickness of between 2 mm and 5 mm, while the second workpiece 11 ("top plate") may be between 0.2 mm and 0.5 mm thick.

The workpiece stack 9 lies in the workpiece plane defined by the support device 6. A supporting area 13 is provided beneath the workpiece stack 9, the workpiece stack 9 bearing on said supporting area.

As can be gathered in particular from FIG. 3, the support device 6 has second clamping elements 14, 14' provided with second clamping jaws 15, 15' for clamping in the workpiece stack 9. The first clamping elements 7, 7' with the clamping jaws 8, 8' lie opposite one another, as do the second clamping elements 14, 14' with the second clamping jaws 15, 15'. In this case, the clamping jaws 8, 8' are arranged perpendicular to the clamping jaws 15, 15' and overall the clamping jaws 8, 8', 15, 15' completely enclose the workpiece stack 9. As a result, the interspace between the workpieces 10, 11 and 12 of the workpiece stack 9 is completely closed off and can be evacuated via a vacuum connection 16 (see FIGS. 2 and 3), a vacuum seal 16' being provided for sealing purposes.

Moreover, the apparatus according to the invention has means for moving the holder 5 with the friction tool 1 parallel to the workpiece plane of the workpiece stack 9, as is indicated by the arrows P in FIG. 3. Moreover, the holder 5 is provided with a hydraulic cylinder 17 in order to exert a predetermined pressure by the friction tool 1 on the workpieces 10, 11 and 12 perpendicular to the supporting area 13.

The clamping elements 7, 7' and 14, 14' are additionally provided with means for respectively increasing their distance, so that the workpiece stack 9 can be prestressed in two directions running in the workpiece plane and perpendicular to one another.

An electron gun 18, which can likewise be moved parallel to the workpiece plane, is provided above the workpiece plane and thus above the workpiece stack 9, said electron gun being oriented towards the workpiece stack 9. It is thus possible for the surface of the workpieces 10, 11 and 12 to be freed of an oxide layer, if appropriate, by irradiation.

Arranged beneath the supporting area 13 is an induction heating element 19, which can be moved in the plane of the supporting area and can be used to introduce thermal energy into the workpiece stack 9 in a locally delimited manner. As an alternative, a resistance heating element may also be provided instead of the induction heating element 19. Furthermore, it is also conceivable for the entire supporting area 13 to be heated, so that over the entire region of the workpiece stack 9 thermal energy is introduced into the workpieces 10, 12 spaced apart from the friction tool 1.

The friction area 4 of the friction tool 1 is configured in such a way that the contact region between the friction area 4 and the second workpiece 11 runs completely in the surface of the second workpiece 11 if the friction tool 1 bears on the second workpiece and is rotated about the axis 3 of rotation. As a result, a friction contact between the second workpiece 11, on the one hand, and the friction tool 1, on the other hand, occurs only in that surface of the second workpiece 11 which is remote from the first workpiece 10.

As can be gathered in particular from FIG. 4, the friction area 4 has no projections whatsoever which might penetrate into the workpiece stack 9 during a rotation of the friction tool 1. Rather, the friction area 4 is formed in virtually planar fashion, so that the friction tool 1 rubs exclusively against the workpiece surface and does not for instance penetrate into the workpieces 10, 11 and 12 if the latter are plasticized on account of the frictional heat. The friction area 4 is merely provided with a rotationally symmetrical profiling in order to prevent material removal from the contact region, the profiling having a circumferential depression 4'.

As shown by the exemplary embodiment of a friction tool 1 illustrated in FIG. 5, said friction tool is provided with a connection section 20 and a cylindrical front section 21 having the friction area 4 running perpendicular thereto, which, in contrast to the exemplary embodiment explained in FIG. 4, is not profiled but rather planar. The friction area 4 is provided with means for material transport in the plane of the friction area 4. Said means have grooves 22 which proceed from the outer edge region of the friction area 4 and furthermore run towards the centre Z with an inclination with respect to the tangent of the circumference of the friction area 4. In this case, the grooves 22 are additionally curved towards the centre. If the friction tool 1 rotates according to the arrow in FIG. 5 b), material that has been plasticized by frictional heat is moved from the edge region of the friction area 4 towards the centre in the grooves 22, with the result that the latter function as channels.

The second exemplary embodiment of a friction tool 1' as illustrated in FIG. 6 differs from that illustrated in FIG. 5 firstly by the fact that instead of only having three grooves 22 it has five grooves 22', which, however, are formed similarly to the grooves 22 of the first exemplary embodiment. Secondly, the friction area 4 is provided with a profiling as has already been explained in connection with FIG. 4.

The alternative exemplary embodiment of a friction tool 1" as illustrated in FIG. 7 is provided for the case where the axis 3' of rotation of the friction tool 1" runs parallel to the surface of the second workpiece 11 and thus to the workpiece plane, and where the friction area 4 is then formed by the circumferential area of the cylinder section 23 of the friction tool 1". In order to achieve a material transport towards the centre of the friction area 4 during rubbing at the surface of the second workpiece 11, said friction area is provided with a first helical circumferential groove 24 running from the first end of the cylinder section 23 towards the centre thereof. Furthermore, the friction tool 1" is provided with a second circumferential groove 25 running helically and extending from the second end towards the centre. In this case, the circumferential grooves 24, 25 run towards the centre of the cylinder section 23 with mutually opposite pitch.

FIG. 8 illustrates a fourth exemplary embodiment of a friction tool 1''' according to the invention. In this case, the friction tool 1''' has a spherical friction area 4 alongside the connection section 20, which is associated with the advantage that workpieces 10 having curved surfaces can also be processed by the friction tool 1''', as is indicated in FIG. 8. Such a configuration of the friction area 4 is advantageous when the apparatus according to the invention is intended to be used for coating workpieces 10, the coating initially being applied in the form of a thin film. A connection between the workpiece 10 and the film is subsequently produced by means of the method according to the invention. In particular an application in the case of sockets of ball-and-socket joints is conceivable here.

In order to prevent in particular the topmost, second workpiece 11 of the workpiece stack 9 from bulging during the rotation of the friction tool 1 on its surface, a holding-down device 26 represented in FIG. 9 may be provided on the apparatus illustrated in FIGS. 1 to 4. The holding-down device 26 comprises a support plate 27 formed in two parts and having a slot 28, in which a brass block 29 is mounted in a displaceable manner. Furthermore, the holding-down device 26 has a leaf spring 30 pivotably connected by a first end to the holding device by means of a bolt 31. The second end of the leaf spring 30 is provided with an elongated hole 32 and presses onto the brass block 29. A bolt 33 is furthermore arranged in the elongated hole 32, which bolt can move in the elongated hole and is connected to the brass block 29.

Alongside the brass block 29, the friction tool 1 is positioned in the slot 28 and moves in the slot 28, and it pushes the brass block 29 in front of it. On account of the effect of the leaf spring 30, the brass block 29 presses the workpieces 10, 11 and 12 in the direction of the supporting area 13 and thus prevents the workpieces 10, 11 and 12 from bulging.

The method according to the invention for producing a welded connection between a first workpiece 10 and at least one second workpiece 11 is explained below with reference to FIGS. 10 and 11, the first and second workpieces 10, 11 being arranged on a third workpiece 12 in this preferred embodiment of the method. In this case, the illustration in FIG. 10 represents the situation as occurs in the case of an Al—U/Mo—Al nuclear fuel element. In this case, the second workpiece 11 and the third workpiece 12 are in each case aluminium plates surrounding a U/Mo plate in the interior as first workpiece 10. In this case, the first workpiece 10 is additionally surrounded by an annular element 34 made of aluminium.

In an application of this type, it is important that the first workpiece 10 bears against the second workpiece 11 and also against the third workpiece 12 and that there are no gas inclusions between the workpieces 10, 11 and 12. This necessitates welding the workpieces 10 and 11 along a meandering line over the entire area of the sandwich fuel element. On the other hand, phase transformations that render the material unusable for use as a fuel element take place in the U/Mo plate even at comparatively low temperatures. Therefore, during welding, the first workpiece 10 must be prevented from being exposed to high temperatures. In the method according to the invention, the third workpiece 12, the first workpiece 10 and the second workpiece 11 are arranged one above another on the supporting area 13.

Before the second workpiece 11 is arranged on the first workpiece 10, that surface of the first workpiece 10 which faces the second workpiece 11 may be irradiated by means of the electron gun 18 (FIG. 1) in the region where the weld seam is later to be formed, in order to remove oxides that might impede the formation of the weld seam. This is because an oxide layer may act as a diffusion barrier and thus make it more difficult to form a cohesive connection between the workpieces 10, 11. Moreover, the electron irradiation serves for producing microholes on that surface of the first workpiece 10 which faces the second workpiece 11, which leads to a mechanical "interlocking" of the workpieces 10, 111 and thus to a stabler connection.

Subsequently, the friction tool 1 is placed in the direction of the arrow 35 onto that surface of the second workpiece 11 which is remote from the first workpiece 10, and the friction tool 1 is caused to effect rotation by the drive 2 (FIG. 1) as indicated by the arrow 36. In this case, the friction area 4 rubs on that surface of the second workpiece 11 which is remote from the first workpiece 10, the contact region between the friction area 4 and the second workpiece 11 running completely in that surface of the second workpiece 11 which is remote from the first workpiece 10. In this case, the rotational speed about the axis 3 of rotation of the friction tool 1 is chosen such that a sufficiently large region of the second workpiece 11 beneath the friction tool 1 is plasticized and a welded connection forms between the first workpiece 10, on the one hand, and the second workpiece 11, on the other hand, beneath the friction tool 1. In this case, moreover, a predetermined pressure is exerted in the direction of the arrow 35 on the surface of the second workpiece 11 by the friction tool 1, which promotes the formation of the welded connection.

In order to achieve a linear weld seam between the workpieces 10, 11, the friction tool is moved further in the direction of the arrow 37 with continued rotation and with the pressure remaining the same on the workpiece stack 9.

In order to further promote the formation of the welded connection between the workpieces 10, 11, heat is introduced in particular into the third workpiece 12 and the first workpiece 10 during the rotation of the friction tool 1 via the induction heating element 19. In this case, the induction heating element 19 is concomitantly moved with the friction tool 1 in parallel with the movement of said friction tool. In this way, only a limited region of the workpieces 10, 11 and 12 is heated by the induction heating element 19 (in this respect, see FIG. 1). However, the energy input into the workpieces 10, 11 and 12 on account of the heating is at any rate far below the threshold at which relatively large microstructure alterations occur in the workpieces 10, 11 and 12, which in particular also occur in the region outside the weld seams.

In order to prevent the workpieces 10, 11 and 12 from bulging relative to one another during welding, the first clamping elements 7, 7' exert a first tensile stress on the workpieces 10, 11 and 12, said first tensile stress running parallel to the plane of that surface of the second workpiece 11 which bears against the friction tool 1. In parallel therewith, a second tensile stress is exerted on the workpieces 10, 11 and 12 by the second clamping elements 14, 14', said second tensile stress likewise running parallel to the plane of that surface of the second workpiece 11 which bears against the friction tool 1, and in this case being perpendicular to the first tensile stress. The workpiece stack 9 is thereby kept under stress in its extension plane, with the result that warpage cannot occur.

In order to prevent in particular the second workpiece 11 from lifting off from the other workpieces 10, 12, the second workpiece 11 may be pressed in the direction of the first workpiece 10 before the friction tool 1 as seen in the direction 36 of movement of said friction tool, the holding-down device 26 described with reference to FIG. 9 being employed.

As already explained with reference to FIGS. 5, 6 and 7, the friction area 4 has grooves 22 along which plasticized material can be transported from the edge of the friction tool 1 towards the axis 3 of rotation during the rotation of the friction tool 1. This prevents removal of material from the region in which the weld seam is produced during the movement of the friction tool 1 in the direction of the arrow 36 on account of the rotation.

During the movement of the friction tool 1 in the direction of the arrow 37, the interspace between the workpieces 10, 11 and 12 is evacuated via the vacuum connection 16 (see FIG. 3), with the result that gas inclusions between the workpieces 10, 11 and 12 cannot occur.

FIG. 11 illustrates an alternative embodiment of the method according to the invention, in which the axis 3' of rotation of the friction tool 1" runs parallel to the surface of the second workpiece 11. For the rest the method is carried out in the same way as has already been explained in connection with FIG. 10. In this case, the circumferential area of the cylinder section 23 of the friction tool 1" has helical circumferential grooves 24, 25 that have already been explained in connection with FIG. 7. The latter bring about a material transport from the ends of the cylinder section 23 to the centre thereof. This prevents material from being pressed out from the region of the weld seam during the movement of the friction tool 1 parallel to the surface of the second workpiece 11.

By means of the apparatus according to the invention and also the method according to the invention, it is possible to weld together planar workpieces 10, 11 and 12 along their surfaces, that is to say in a parallel joint, without on the one hand the workpieces 10, 11 and 12 being heated to such a great extent that microstructure alterations occur in the workpieces 10, 11 and 12, and without on the other hand an intermixing of the materials of the workpieces 10, 11 and 12 occurring. The method is thus suitable particularly for connecting thin plates, as is necessary in the production of sandwich fuel elements. Moreover, coatings for protection against corrosion or for improving the surface hardness can be applied to workpieces, a defined interface remaining between the workpiece and the coating and an intermixing of the materials not occurring.

What is claimed:

1. Method for producing a linear welded connection between a first workpiece (10) and a second workpiece (11), comprising the following steps of:
    providing a first workpiece (10) and a second workpiece (11),
    arranging the second workpiece (11) on a surface of the first workpiece (10), and
    placing a friction tool (1) by the friction area (4) thereof onto that surface of the second workpiece (11) which is remote from the first workpiece (10),
    rotating the friction tool (1), with the result that a welded connection is formed between the first workpiece (10) and the second workpiece (11), the friction area (4) rubbing on that surface of the second workpiece (11) which is remote from the first workpiece (10), the friction tool (1) being moved during the rotation thereof along that surface of the second workpiece (11) which is remote from the first workpiece (10) and the friction tool (1) being rotated about an axis (3) perpendicular to that surface of the second workpiece (11) which is remote from the first workpiece (10), the contact region between the friction area (4) and the second workpiece (11) running completely in that surface of the second workpiece (11) which is remote from the first workpiece (10), so that the friction tool does not penetrate into the volume of the second workpiece (11), and the rotation of the friction tool (1) effecting a material transport from the edge of the friction tool (1) towards the axis (3) of rotation by means of grooves (22, 22') running in the plane of the friction area (4), the grooves (22, 22') proceeding from the outer edge region of the friction area (4) and the grooves (22, 22') running with an inclination with respect to the tangent of the circumference of the friction area (4) towards the centre (Z).

2. Method according to claim 1, the friction tool (1) being pressed against the surface of the second workpiece (11) with a predetermined pressure during the rotation of the friction tool (1).

3. Method according to claim 1, the second workpiece (11) being pressed in the direction of the first workpiece (10) before the friction tool (1) as seen in the direction of movement of said friction tool (1).

4. Method according to one of claim 1, the first workpiece (10) being heated.

5. Method according to claim 4, the first workpiece (10) bearing against a heating element by a surface which is remote from the second workpiece (11).

6. Method according to claim 4, the first workpiece (10) being heated inductively.

7. Method according to claim 4, the heating of the first workpiece (10) being restricted to that region of the first workpiece (10) which lies opposite the friction tool (1).

8. Method according to claim 1, a third workpiece (12) being provided, the first workpiece (10) being arranged on the third workpiece (12) and the second workpiece (11) being arranged on the first workpiece.

9. Method according to claim 8, a first tensile stress being exerted on the workpieces (10, 11, 12) and the first tensile stress running parallel to the plane of that surface of the second workpiece (11) which bears against the friction tool (1).

10. Method according to claim 9, a second tensile stress being exerted on the workpieces (10, 11, 12), the second tensile stress running parallel to the plane of that surface of the second workpiece (11) which bears against the friction tool (1), and at least one component of the second tensile stress running perpendicular to the first tensile stress.

11. Method according to claim 1, that surface of the first workpiece (10) which faces the second workpiece (11) being at least partly irradiated before the second workpiece (11) is arranged on the first workpiece (10).

12. Method according to claim 11, that surface of the first workpiece (10) which faces the second workpiece (11) being irradiated by means of a laser.

13. Method according to claim 11, that surface of the first workpiece (10) which faces the second workpiece (11) being irradiated by means of an electron beam.

14. Method according to claim 8, the region between the workpieces (10, 11, 12) being evacuated.

15. Method according to one of claim 2, the first workpiece (10) being heated.

16. Method according to one of claim 3, the first workpiece (10) being heated.

17. Method according to claim 5, the first workpiece (10) being heated inductively.

* * * * *